3,320,141
ELECTROLYTIC PROCESS OF MAKING TERNARY SULFONIUM HYDROXIDES
Merle E. Cisney and Robert J. Herschler, Camas, Wash., assignors to Crown Zellerbach Corporation, San Francisco, Calif., a corporation of Nevada
No Drawing. Filed Dec. 8, 1965, Ser. No. 512,534
8 Claims. (Cl. 204—101)

This invention relates to a process for the preparation of ternary sulfonium hydroxides.

The present application is a continuation-in-part of Ser. No. 219,757, filed Aug. 27, 1962, now abandoned.

It would be desirable for many industrial applications to have available strong, organic bases free of metallic cations. Typical of such applications are the use of an organic base in place of caustic soda as a catalyst for the preparation of phenolformaldehyde resins, as a neutralizing agent in systems where the presence of a metallic cation is undesirable, and as a solvent in various organic solvent systems.

The ternary sulfonium hydroxides, being all-organic bases of high basicity, are ideally suited for use in such applications. However, although they may be prepared easily by conventional chemical procedures, it has not been possible to separate them from contaminating metallic cations. Even the application of such techniques as passing them through an ion exchange column for elimination of the contaminating ions has not been successful in solving the problem.

It is known to electrolyze quaternary ammonium salts to the corresponding hydroxides, as described, for example, in U.S. Patent No. 2,363,387 to Bock. However, this process is described as requiring an electrolysis time of about 48 hours on a batch basis, and did not appear to be economically feasible as a possible route for preparing ternary sulfonium hydroxides from ternary sulfonium halides. In addition, it was believed that the purity of any sulfonium hydroxide obtained by electrolysis might not be good as there was likely to be some mercaptan formed as a co-reaction product if the reaction proceeded as a cathodic reduction. Furthermore, there was the possibility that the electrolysis reaction might proceed as an anodic oxidation and there would be no hydroxide produced at all, but rather a sulfonic acid or a disulfide or a mixture of the two.

It has been found, however, that the electrolysis of a ternary sulfonium halide may be effected whereby a ternary sulfonium hydroxide is produced which is extremely pure and contains little or no contaminating metallic cations or mercaptans. In addition, an electrolysis process has been found whereby the ternary sulfonium halide is substantially converted into the corresponding hydroxide in the surprisingly short electrolysis time of less than about 3 hours.

Accordingly, it is the general object of the present invention to provide an electrolysis process for the preparation of ternary sulfonium hydroxides, which process may be carried out rapidly, inexpensively and with high efficiency of conversion to produce a wide variety of sulfonium hydroxide products substantially free of contaminating substances.

Briefly, the process of the present invention comprises providing an electrolysis cell comprising an anode compartment containing an anode, a cathode department containing a cathode, and a semipermeable membrane diaphragm separating said anode chamber and said cathode chamber, said diaphragm being composed of a material which has no chemical reactivity with the ternary sulfonium hydroxide product to be formed and having a porosity, measured as water permeability, of up to 150 gallons per minute per square foot at 1.0 p.s.i.; placing into said anode compartment an aqueous solution of a ternary sulfonium halide of the general formula $$RR_1R_2S^+X^-$$

wherein the R groups are hydrocarbon radicals having a total number of carbon atoms not exceeding 20, and X is a halide; placing water into said cathode compartment; effecting electrolysis by impressing an electrical current between said anode and said cathode, thereby forming a ternary sulfonium hydroxide in said cathode compartment; and recovering said ternary sulfonium hydroxide from said cathode compartment.

Generally stated, the herein described process of preparing ternary sulfonium hydroxides comprises electrolyzing an aqueous solution of a ternary sulfonium by the general reaction indicated below, the sulfonium hydroxide product being maintained separated from the other products of the electrolytic reaction by diaphragms of certain inert materials hereinafter described, and separated in the pure state:

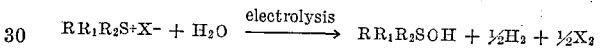

In the foregoing general formula the R groups represent hydrocarbon radicals selected from the group consisting of alkyl, aryl, aralkyl, or alkaryl which may be unsubstituted, or substituted, and X is a halide. The hydrocarbon radicals should have a total number of carbon atoms not exceeding 20. This insures sufficient ionic mobility to permit effectuation of the electrolytic reaction at a practical conversion rate. The substituted hydrocarbon radicals may be substituted with halogens or other groups which do not interfere with the electrolytic reaction. The halide anion may be any of the halides although, for reasons of economy, the chloride and bromide anion are preferred.

Thus, provided the total number of carbon atoms in the ternary sulfonium halide molecule does not exceed 20, the hydrocarbon groups in the foregoing general formula may comprise the methyl, ethyl, propyl, isopropyl, butyl, amyl, heptyl, dodecyl, phenyl, tolyl, benzyl, and like groups.

Specific examples of especially suitable ternary sulfonium salts which may be used as starting materials for the present invention are the trimethyl sulfonium halides, the dimethyl ethyl sulfonium halides, the butyl dimethyl sulfonium halides, the triethyl sulfonium halides, and the dodecyl dimethyl sulfonium halides.

Trimethyl sulfonium chloride is a preferred starting material, since it is inexpensively prepared from dimethyl sulfide, a by-product obtainable from paper mill pulping waste liquors, and since the trimethyl sulfonium hydroxide, which is the end product of the electrolytic reaction, is a powerful organic base having a high basic equivalence per unit weight.

The electrolytic cell employed for effecting the electrolysis reaction comprises a conventionally constructed two- or three-compartment cell. The diaphragms separating the compartments are inert, semi-permeable, membranes of polymeric materials selected from the group consisting of epoxy, polyvinyl chloride, Dynel, nylon, polyolefins such as polyethylene, polypropylene and Teflon (polytetrafluoroethylene), and Dacron (a condensation product of dimethyl terephthalate and ethylene glycol). By "inert" is meant materials inert to reaction with the sulfonium hydroxide product being produced. Other materials such as ceramics and asbestos which may be considered as being generally inert, have been found to be unsatisfactory. This is believed to be due to reaction between the very strongly basic sulfonium hydroxide with material in the diaphragm wall containing silica, which results in the formation of silica gel within the interstices of the diaphragm, thereby quickly rendering the diaphragm impermeable. The inert, semi-permeable membrane diaphragms may be formed of woven or non-woven fibers of the polymers described, and may be sintered or non-sintered.

The pore size of the diaphragms employed in this invention should be large enough to permit reasonably rapid rate of ionic diffusion of the sulfonium ion into the cathode compartment at reasonable current densities. However, the pores should not be so large as to permit liquid diffusion of the non-electrolyzed sulfonium halide compound into the cathode compartment which would result in contamination of the sulfonium hydroxide product. It has been found, surprisingly, that diaphragms having a relatively large porosity may be employed with substantially no contamination of the product with electrolyte. Employing diaphragms having such large porosities is advantageous in that it permits the electrolysis to proceed at rapid rates and relatively low current densities. Ceramic diaphragms have porosities (measured as water permeability) of about $2 \times 10^{-4}$ gallons per minute per square foot at 1.0 p.s.i. The porosities of the diaphragm materials of this invention are desirably much greater than that for ceramic and may range up to 150 gallons per minute per square foot at 1.0 p.s.i. The preferred porosity range is a water permeability of from about 1.0 to about 100 gallons per minute per square foot at 10 p.s.i. The following table set forth examples of various suitable diaphragm materials of this invention and their permeability characteristics:

PERMEABILITY CHARACTERISTICS OF DIAPHRAGM MATERIALS

| Material | Thickness (mils) | Water Permeability (g.p.m./ft.$^2$/1.0 p.s.i.) | Porosity (percent voids) | Approximate Pore Size (microns) |
| --- | --- | --- | --- | --- |
| Epoxy | | 108 | | 5 |
| Do | | 67 | | 1–2 |
| Dynel | 0.009 | 150 | 66 | 8 |
| Do | 0.020 | 8 | 40 | 1 |
| Do | 0.070 | 68 | 44 | 3 |
| Do | 0.030 | 8 | 50 | 2 |
| Nylon | 0.125 | | | 60 |
| Polyethylene (conventional) | 0.125 | | | 90 |
| Polyethylene (high density) | 0.006 | 13 | 66 | 20 |
| Teflon | 0.0055 | 4 | 65 | 10 |
| Do | 0.0055 | 2 | 67 | 5 |
| Do | | | | |
| Polyvinyl Chloride [1] | | [2] 68 | | 9 |
| Do | | [2] 45 | | 3 |

[1] With woven nylon reinforcement.
[2] At 15 p.s.i.

With the diaphragm materials described, sulfonium halides may be electrolyzed to the corresponding sulfonium hydroxide in short periods of time employing a current of about 20 to 30 amperes and a potential of about 6 to 15 volts. The electrolysis may be effected on either a continuous or discontinuous (batch) basis. If the cell is operated on a batch or discontinuous basis, it has been found that substantially complete conversion of the sulfonium halide to the hydroxide may be effected in less than about three hours.

The electrode materials employed in the electrolysis cell are not critical and may be any of those conventionally employed. The anode is desirably carbon and the cathode desirably stainless steel due to the corrosive resistivity of these materials and because they are relatively inexpensive. Their distance apart in the cell depends upon many factors, and may be optimally determined for each set of operating conditions. Desirably, they should be as close together as possible.

While either a two- or three-compartment electrolysis cell may be employed, it is preferred to employ a three-compartment cell having a double diaphragm due to the improved efficiency obtained thereby. When a two-compartment cell is employed, the sulfonium halide solution is placed into the anode compartment. When a three-compartment cell is employed, the sulfonium halide is preferably placed into the center compartment.

The concentration of the sulfonium halide employed in the aqueous electrolyte solution should be less than about 60%, and desirably from about 1 to 25% in order to obtain good power and current efficiency. When concentrations from about 1 to 25% are employed, current efficiencies of 35 to 40% are obtainable. However, when employing the more dilute sulfonium halide solutions, greater water transference into the cathode compartment may be obtained. This is undesirable, but it has been found that this may be prevented by employing a high hydrostatic head in the cathode compartment. Antifoaming agents, surface active agents, electrolysis-enhancing materials such as hydrochloric acid and other additives may be included as desirable or necessary.

The selected current density then may be applied to the electrodes and the electrolysis continued until the conversion of the ternary sulfonium salt to the ternary sulfonium hydroxide has been completed to the desired degree. The current density impressed is variable, depending upon such factors as the identity of the ternary sulfonium salt employed, the temperature of the electrolysis mixture, the concentration of the solution, the desired speed of electrolytic conversion, and related factors. In general, the higher the current density applied, the faster the rate of conversion.

Although the electrolytic reaction desirably may be carried out at normal room temperature, it may be effectuated at any temperature within the range above the freezing point and below the boiling point of the electrolyte. A preferred operating range is from 10–60° C. Accordingly, suitable cooling means may be associated with the electrolytic cell to cool the solution to the predetermined temperature and to maintain it at that temperature during the course of the reaction.

The process of the invention is illustrated in the following examples:

*Example 1*

This example illustrates the application of a Dynel fiber non-woven cloth as a semi-permeable membrane in the electrolytic cell.

A double diaphragm three-compartment cell was constructed having a porous Dynel fiber non-woven cloth diaphragms. The cloth thickness was 0.009 inch and the water permeability was 150 g.p.m./ft.$^2$/1.0 p.s.i. The anode was a carbon rod and the cathode a perforated catholyte steel sheet.

The cell was operated using a 10% trimethyl sulfonium chloride aqueous solution as the starting material. At the beginning of the reaction, the dilute trimethyl sulfonium chloride solution was used to fill the middle chamber and a dilute hydrochloric acid solution to fill the anode chamber. A current of 25 amperes and 8 volts was impressed.

In 120 minutes, analysis showed about 75% by weight conversion to the hydroxide.

The trimethyl sulfonium chloride was converted to trimethyl sulfonium hydroxide of 99% purity. The conversion cost, for the electricity consumed, averaged about $0.01 per pound of product.

*Example 2*

The procedure of Example 1 was followed except that a non-woven nylon cloth was used as the semi-permeable membrane. The membrane had a thickness of 0.03 inch and a water permeability of 8 g.p.m./ft.$^2$/1.0 p.s.i.

The conversion of sulfonium chloride to sulfonium hydroxide again was excellent, being about 75% by weight after 150 minutes. The purity of the hydroxide product was approximately 99%.

*Example 3*

The procedure of Example 1 again was repeated except that a sintered polyethylene sheet was used as the semi-permeable membrane.

Again, the conversion of sulfonium chloride to hydroxide was very good and the purity of the product was about 99%.

*Example 4*

The procedure of Example 1 is followed except that a non-woven Teflon cloth is used as the semi-permeable membrane. The Teflon membrane employed has a water permeability of about 4 g.p.m./ft.$^2$/1.0 p.s.i.

The conversion of the sulfonium chloride to hydroxide is about 70% by weight after 150 minutes. The purity of the product is about 99%.

*Example 5*

The procedure of Example 1 is followed except that the following 25% by weight aqueous solutions are employed as the electrolyte:

Butyl dimethyl sulfonium chloride;
Triethyl sulfonium chloride;
Dodecyl dimethyl sulfonium bromide;
Phenyl dimethyl sulfonium chloride.

Substantial conversion of the foregoing sulfonium halides is obtained in less than three hours. The purity of the hydroxide obtained is above about 98%.

It is apparent that by the present invention there has been provided a practical, inexpensive, highly efficient procedure for converting ternary sulfonium salts to ternary sulfonium hydroxides which are substantially free of contaminating metallic ions and accordingly are useful in a wide variety of industrial applications requiring strong, organic bases. The process is well suited, moreover, to the conversion of trimethyl sulfonium chloride to trimethyl sulfonium hydroxide, the trimethyl sulfonium chloride being readily derived from the waste liquor obtained as a by-product from the pulping of wood during the papermaking procedure.

It is apparent that various modifications may be made in the process described, which modifications are intended to be included within the scope of the following claims.

We claim:

1. The process of preparing a ternary sulfonium hydroxide of high purity comprising:

providing an electrolysis cell comprising an anode compartment containing an anode, a cathode compartment containing a cathode, and a semi-permeable membrane diaphragm separating said anode chamber and said cathode chamber, said diaphragm being composed of a material which has no chemical reactivity with the ternary sulfonium hydroxide product to be formed and having a porosity, measured as water permeability substantially greater than $2 \times 10^{-4}$ gallons per minute per square foot at 1.0 p.s.i., but less than about 150 gallons per minute per square foot at 1.0 p.s.i.;

placing into said anode compartment an aqueous solution of a ternary sulfonium halide of the general formula $$RR_1R_2S^+X^-$$

wherein the R groups are hydrocarbon radicals having a total number of carbon atoms not exceeding 20, and X is a halide;

placing water into said cathode compartment;

effecting electrolysis by impressing an electrical current between said anode and said cathode, thereby forming a ternary sulfonium hydroxide in said cathode compartment;

and recovering said ternary sulfonium hydroxide from said cathode compartment.

2. The process of claim 1 wherein said diaphragm has a porosity, measured as water permeability, of from about 1.0 to about 100 gallons per minute per square foot at 1.0 p.s.i.

3. The process of claim 1 wherein said diaphragm material is a polymer selected from the group consisting of epoxy, polyvinyl chloride, Dynel, nylon, polyethylene, polypropylene, polytetrafluoroethylene and the condensation product of dimethyl terephthalate and ethylene glycol.

4. The process of claim 1 wherein said ternary sulfonium halide is trimethyl sulfonium chloride.

5. The process of preparing a ternary sulfonium hydroxide of high purity comprising:

providing an electrolysis cell comprising an anode compartment containing an anode, a cathode compartment containing a cathode, and a third compartment located intermediate said anode and cathode compartments, said third compartment being separated from said anode and cathode compartments by a semi-permeable membrane diaphragm composed of a material which has no chemical reactivity with the ternary sulfonium hydroxide product to be formed and having a porosity, measured as water permeability, substantially greater than $2 \times 10^{-4}$ gallons per minute per square foot at 1.0 p.s.i., but less than about 150 gallons per minute per square foot at 1.0 p.s.i.;

placing into said third compartment an aqueous solution of a ternary sulfonium halide of the general formula $$RR_1R_2S^+X^-$$

wherein the R groups are hydrocarbon radicals having a total number of carbon atoms not exceeding 20, and X is a halide;

placing water into said anode and cathode compartments;

effecting electrolysis by impressing an electrical current between said anode and said cathode, thereby forming a ternary sulfonium hydroxide in said cathode compartment;

and recovering said ternary sulfonium hydroxide from said cathode compartment.

6. The process of claim 5 wherein said diaphragm has a porosity, measured as water permeability, of from about 1.0 to about 100 gallons per minute per square foot at 1.0 p.s.i.

7. The process of claim 5 wherein said diaphragm material is a polymer selected from the group consisting of epoxy, polyvinyl chloride, Dynel, nylon, polyethylene, polypropylene, polytetrafluoroethylene and the condensation product of dimethyl terephthalate and ethylene glycol.

8. The process of claim 5 wherein said ternary sulfonium halide is trimethyl sulfonium chloride.

References Cited by the Examiner

UNITED STATES PATENTS 2,363,387  11/1944  Bock _____ 204—72

FOREIGN PATENTS 146,728  7/1962  Russia.

OTHER REFERENCES

Webster, New International Dictionary, Springfield, Mass., G & C Merriam Co., 1960, page 2524, column 2, lines 6–9.

JOHN H. MACK, *Primary Examiner.*

H. M. FLOURNOY, *Assistant Examiner.*